Figure 6:
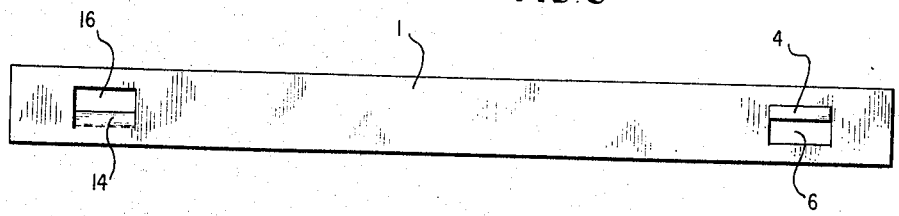

Nov. 22, 1966  H. OETIKER  3,286,314
METHOD OF MANUFACTURING RINGS AND RIVETED
ENDLESS ANNULAR STRUCTURES
Filed Jan. 21, 1964  2 Sheets-Sheet 1
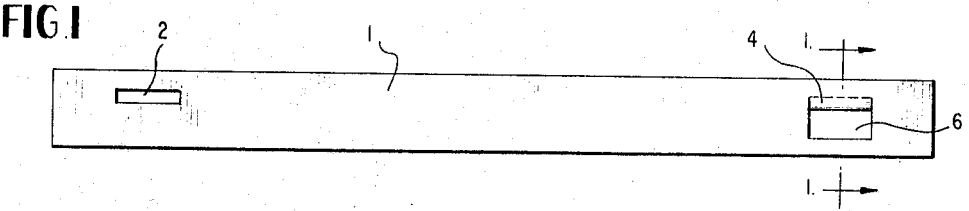
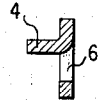
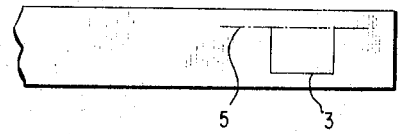
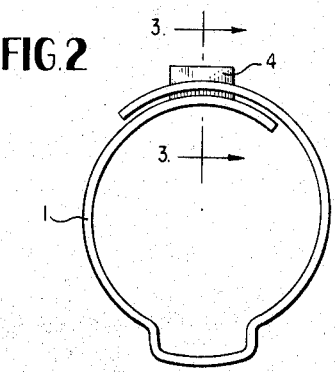
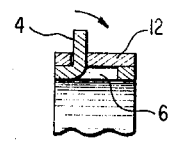
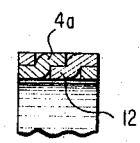
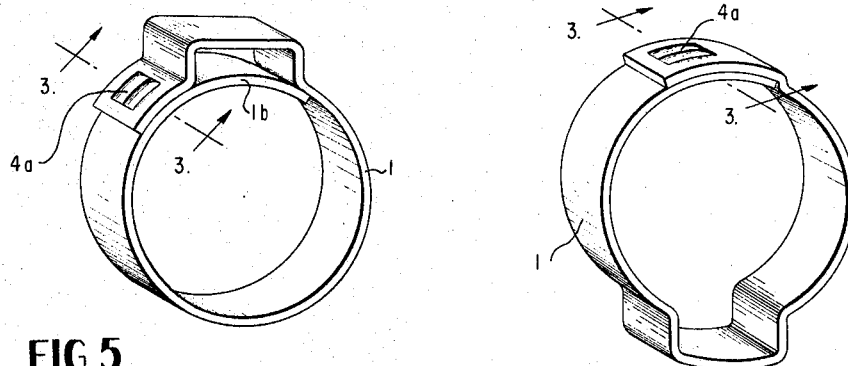
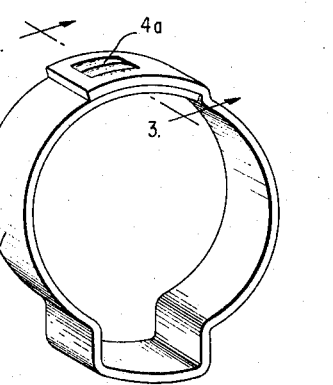
INVENTOR.
HANS OETIKER
BY Paul M. Craig, Jr.
ATTORNEY Nov. 22, 1966  H. OETIKER  3,286,314
METHOD OF MANUFACTURING RINGS AND RIVETED
ENDLESS ANNULAR STRUCTURES
Filed Jan. 21, 1964  2 Sheets-Sheet 2

INVENTOR.
HANS OETIKER
BY Paul M. Craig, Jr.
ATTORNEY

United States Patent Office

3,286,314
Patented Nov. 22, 1966

3,286,314
METHOD OF MANUFACTURING RINGS AND
RIVETED ENDLESS ANNULAR STRUCTURES
Hans Oetiker, 21 Oberdorfstrasse, Horgen, Switzerland
Filed Jan. 21, 1964, Ser. No. 339,223
Claims priority, application Switzerland, Jan. 29, 1963,
1,091/63
18 Claims. (Cl. 24—20)

The present invention relates to a method for the manufacture of rings for any desired application purpose, and in particular, the method of the present invention is provided for the manufacture of closed or endless hose clamps which are adapted to be clamped to a hose by contracting ear-shaped lugs or folds or the like, and further relates to the rings and clamps obtained by the method of manufacture in accordance with the present invention.

Rings of the type of the known hose clamps having ear-shaped lugs or folds which can be clamped to the hose in a simple manner by means of pincers require a tough material which is deformable without damage during contraction. Rings have been appropriately utilized heretofore which could be cut off from drawn steel tubing or pipes as starting material.

With rings, for example, with those rings for hose clamps having a relatively small diameter, for instance, with those of less than 15 mm. in diameter, where oftentimes one lug or ear is sufficient for the required contraction, it has been found that such starting material, namely drawn seamless tubing or pipes is relatively expensive. It is furthermore desirable to utilize relatively thin material for the rings. The difficulty thereby exists that seamless drawn steel tube or pipe stock cannot be manufactured at moderate prices with sufficiently thin walls.

The present invention now starts with the concept to abandon seamless drawn steel pipes and in place thereof to punch out the starting material in the form of strips or cut off the starting material from a band. Such strips bent together into rings can be closed by spot-welding. However, since bright steel has to be used for the welding, a subsequent finishing by nickel-plating, chrome-plating and the like is no longer possible as a subsequent rusting and corrosion of the welded places is practically unavoidable by reason of the required chemical after-treatment.

Rings with folds extending transversely to the circumferential direction, which can also be used with pre-finished or with subsequently cleansed stamping strips, do not exhibit a sufficient mechanical rigidity.

The present invention now starts with the concept to prepare the strip to be punched, possibly the completely finished strip to be punched, for a riveting operation with particularly high rigidity.

The present invention essentially consists in providing a sheet metal strip with a longitudinal slot at one end thereof and with a tab or lug protruding perpendicularly from the sheet metal strip at the other end thereof by first stamping or punching into the strip a U-shaped cut and by subsequently pressing through the thus cut strip portion, and in that during further operating steps the strip is bent into a ring and the tab or lug is inserted into and pushed through the slot, whereupon the tab or lug is bent back by means of a bending and pressing tool, and by further compression the material disposed under the lug or tab of the other end of the strip is thereby pressed into the existing aperture or opening of the U-shaped cut-out.

With the present U-shape the center boundary or web of the U has to be thought of as a straight line for purposes of the present invention.

It is further essential that the length of the longitudinal slot corresponds to the width of the tab or lug. A compact interlacing of the two ends of the ring is thereby achieved subsequently during the bending and pressing operations which cannot become loose even with the strongest tensional loads or stresses.

Accordingly, it is an object of the present invention to provide a method of manufacture and product resulting from the manufacturing method of the present invention which is simple, relatively inexpensive and at the same time avoids the drawbacks and shortcomings encountered with analogous prior art methods and products.

Another object of the present invention resides in the provision of a method for manufacturing rings, especially clamps of the type described hereinabove which dispenses with the need for relatively expensive materials yet permits use of sufficiently thin-walled stock to provide a deformable material that can be contracted without damage when installing the ring or clamp.

Still another object of the present invention resides in the provision of a method for manufacturing hose clamps which dispenses with the need for relatively costly drawn steel tubing and permits the use of less costly steel bands or strips that can be readily made into a clamp having the ends thereof securely joined together without a welded joint.

Another object of the present invention resides in the provision of an endless ring made of band or strip material which obviates the need for welded joints yet assures a completely reliable joint and connection of the ring ends.

Still another object of the present invention resides in the method of manufacturing ring-like structures from band or strip material which allows pre-treatment and/or after-treatment of the material, such as finishing in the form of nickel-plating, chrome-plating, etc., without danger of corrosion of the joint.

A further object of the present invention resides in the provision of a ring of the type described hereinabove which offers particularly high rigidity and provides a securely interlocked connection in the form of a rivet joint between the two ends of the ring.

Still a further object of the present invention resides in the provision of a method for manufacturing a ring usable as hose clamp which not only permits the use of band or strip material but also assures a compact interlocking of the ends of the strip material without welded joints and without impairment to the rigidity thereof.

Another object of the present invention resides in the provision of a method for manufacturing hose clamps in which the ends of the band or strip material are mechanically interlocked yet requires only relatively small cut-outs thereby assuring a relatively small decrease in material cross section while at the same time so arranging the interlocking joint as to absorb the tensional forces in the most favorable direction.

Still another object of the present invention resides in the provision of a method for manufacturing hose clamps and the hose clamps resulting therefrom which avoids any squeezing or pinching of the upper layer of the hose.

A further object of the present invention resides in the provision of a hose clamp and method of manufacturing the same in which the folded and bent parts are able to withstand the maximum mechanical loads to which the article may be exposed so that no danger of failure exists.

A still further object of the present invention resides in the provision of a method for manufacturing a hose clamp which is considerably less expensive than that of the prior art, permits a wide latitude in the selection of the material and wall thickness of the steel band and also permits a pre-finish and complete cleaning of the material for the removal of any chemical residues such as acids.

A further object of the present invention resides in the provision of a manufacturing method for making rings of the type described hereinabove which is particularly suit-table for automated mass production techniques while at the same time allowing maintenance of narrow tolerances to assure accuracy in the diametric dimension of the ring.

Figure 6A:
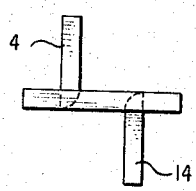
Figure 6B:
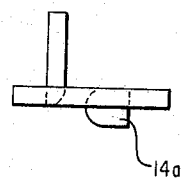
Figure 7:
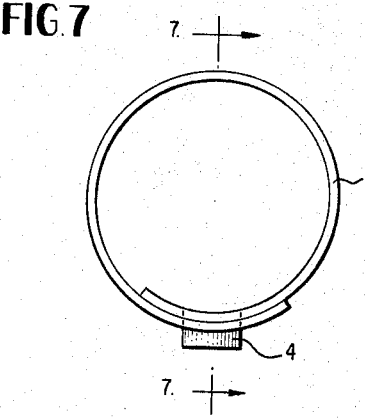
Figure 7A:
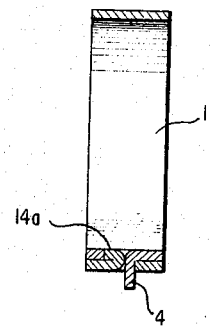
Figure 8:
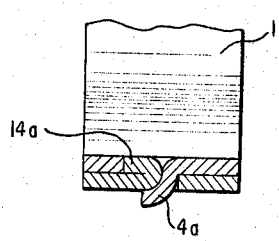

These and other objects, features and advantages of the present invention will become more obvious from the following description when taken in connection with the accompanying drawing which shows, for purposes of illustration only, several embodiments in accordance with the present invention and wherein:

FIGURE 1 is a plan view on a prepared sheet metal strip after certain preliminary operations in accordance with the present invention, FIGURE 1a is a cross-sectional view taken along line 1—1 of FIGURE 1, FIGURE 1b is a partial plan view, similar to FIGURE 1, before the pushing through operation of the tab or lug in accordance with the present invention, FIGURE 2 is an elevational view of the sheet metal strip bent into the shape of a ring partly assembled in accordance with the present invention and provided with an ear or fold, FIGURE 3 is a cross sectional view taken along line 3—3 of FIGURE 2 illustrating the interlacing of the two ends of the finished ring, FIGURE 3a is a partial cross sectional view similar to FIGURE 3 and illustrating the ends of the completed ring after the compressing operation, FIGURE 4 is a perspective view of the completed ring, line 3—3 indicating the cross section along which FIGURE 3a is taken, FIGURE 5 is a perspective view, similar to FIGURE 4, of a modified embodiment of a completed ring, lines 3—3 again indicating the cross section along which FIGURE 3a is taken, FIGURE 6 is a partial plan view on a sheet metal strip prepared in accordance with a modified manufacturing method of the present invention, FIGURE 6a is an end elevational view of the strip of FIGURE 6, FIGURE 6b is an end elevational view, similar to FIGURE 6a, after a further operation in accordance with the method of manufacture of the present invention is performed on the strip, FIGURE 7 is an elevational view of the ring made from the strip of FIGURES 6, 6a and 6b and partly assembled in accordance with the present invention, FIGURE 7a is a cross sectional view taken along line 7—7 of FIGURE 7, and FIGURE 8 is a partial cross sectional view, on an enlarged scale, and indicating the position of the parts of the riveted joints in accordance with the present invention for the ring of FIGURES 7 and 7a, after a further operation in accordance with the present invention.

Referring now to the drawing wherein like reference numerals are used throughout the various views to designate like parts, and more particularly to FIGURE 1, this figure shows a sheet metal strip 1 obtained, for example, by suitable punching operations. The sheet metal strip 1 is provided at one end with a longitudinal slot 2. A U-shaped cut 3 is punched or cut into the strip 1 at the other end thereof, and the cut 3 is then bent into a tab or lug 4 extending perpendicularly from the surface of the strip 1 (FIG. 1a). The bending edge 5 (FIG. 1b) of the tab or lug 4 extends in the longitudinal direction of the strip 1. The width of the lug or tab 4 is matched to the length of the slot 2. The sheet meal strip 1 is then bent according to FIGURE 2 into a ring and the lug or tab 4 is slipped through the longitudinal slot 2. The tab or lug 4 is thereupon bent back by means of a special tool into the initial position as indicated in FIGURE 3 by the arrow. After bending-back of the tab or lug 4 in the direction of its initial position, the material 12, which then comes to lie under and is disposed below the tab or lug 4, is pressed by a further compressing action into the opening 6 left by the U-shaped cut-out 3 and is thereby forcibly displaced and securely locked within the opening 6.

The tab or lug 4a which becomes wider by the pressing action is also forcibly displaced and securely locked in a similar manner within the slot 2.

FIGURE 4 shows in perspective the completed ring according to the present invention.

A particularly compact interlacing and interlocking of the two ends of the strip results with the method described in connection with FIGURES 1 to 4. The thus obtained ring offers a very high rigidity. The cuts and cut-outs can be kept very small so that only a slight decrease in the material cross section results. The bending operations of the sheet metal take place in such a manner that the bending edges are disposed in the circumferential direction, that is, in the direction of the tensile forces or stresses. As a result thereof, the mutual interlocking receives a high rigidity in the tensional direction of the band. Transversely disposed bending edges which would impair the tensile strength are not present in the ring according to the present invention. A loosening of the rivet joint is thereby rendered practically impossible.

FIGURE 5 illustrates the ring of FIGURE 4 with an extended end 1b. Simultaneously, the ear-shaped lug is so positioned that it comes to lie over the extension 1b. As a result thereof any squeezing, pinching or wedging of the upper hose layer that may possibly occur is avoided thereby.

The method in accordance with the present invention may also be realized in a modified form as illustrated in connection with FIGURES 6 through 8.

The method according to FIGURE 6 takes place as before in that a U-shaped cut is pushed or pressed through, and thus the projecting tab or lug 4 is produced at the sheet metal strip 1. The longitudinal slot 16 is produced in the following manner pursuant to which the slot 16 is first punched in as a narrow cut also of U-shape, and the metal portion disposed therebetween is then pressed through as tab or lug 14 in a direction opposite the other tab or lug 4 (FIGURE 6a), and is bent back by 180° with respect to its original position as shown at 14a in FIGURE 6b. Pursuant to further operating steps according to FIGURE 7, the strip is bent into a ring 1 and the tab or lug 4 is slipped through the slot 16.

The tab or lug 4 is thereupon bent back in the direction of the initial position according to FIGURE 8 by means of a bending or pressing tool. During this operation the bent-back tab or lug 14a is pressed into the existing opening 6 of the U-shaped cut-out 16 of the end of the strip 1. The punching and bending operations are thereby so matched to one another that the dog or detent 14a fits as accurately as possible into the cut-out 6. A compact interlocking and interlacing, free of any play, of the two ends of the strip 1 results by the compressing action of the mutually interlaced detent 14a and lug 4a. The bending edges are, in this case, also not exposed to any mechanical loads that would unbend the same again. The bending edge is loaded only in the longitudinal direction thereof so that no danger for failure or fracture exists. The detent 14a forms a dog or detent rigidly and securely anchored within the cut-out 6. In a similar manner, the bent tab or lug 4a forms in the longitudinal slot a detent or dog whereby the mechanical loading is also disposed in the longitudinal direction of the bending edge.

The method in accordance with the present invention enables the use of sheet metal with good punching properties in lieu of rings cut off from tubular stock. A considerable decrease in the manufacturing cost results therefrom. Furthermore, one is able to select the sheet metal strength or gauge far-reachingly freely. The sheet metal strips can be completely finished beforehand and can be cleaned completely satisfactorily of any chemical residues such as acids, etc., and machined thereafter. The method in accordance with the present invention is particularly suited for automatic mass production techniques of the rings. The optimum distance between longitudinal slot and cut and therewith the diameter of the ring can be kept uniformly accurate by the use of the manufacturing method in accordance with the present invention.

While I have shown and described several embodiments in accordance with the present invention, it is understood that the same is not limited thereto but is susceptible of numerous changes and modifications as known to a person skilled in the art. For example, with very wide rings, more than one connection of the rivet type described hereinabove may be provided over the width of the ring. Furthermore, any suitable material may be chosen which has the necessary characteristics to permit application of the method according to the present invention.

Thus, while I have shown and described only several embodiments in accordance with the present invention, it is obvious that the same is susceptible of numerous changes and modifications, and I therefore do not wish to be limited to the details shown and described herein but intend to cover all such changes and modifications as are encompassed by the scope of the appended claims.

I claim:

1. A method for manufacturing rings, comprising the steps of:

providing a relatively narrow and long sheet metal strip with a longitudinal slot near one end thereof of greater length than width and with a lug protruding from said sheet metal strip near the other end thereof and of substantially complementary size to said slot with the relatively longer dimension of said slot and lug being in the longitudinal direction of said strip, thereafter forming the strip in the longitudinal direction thereof into the shape of a ring and inserting said lug into said longitudinal slot, thereupon bending back said lug substantially into the plane of the circumference of the ring, and thereafter applying pressure to the bent back lug in such a manner that the material disposed underneath said lug is pressed into the aperture of the U-shaped cutout whereby all bending edges of the material forming the riveted joint are disposed in the circumferential direction and oppose opening of the joint in the presence of forces seeking to expand the ring in its diameter.

2. A method for manufacturing rings, especially endless hose clamps which are adapted to be clamped onto a hose by contracting an ear-shaped fold or the like, comprising the steps of:

providing a sheet metal strip having a longitudinal direction of much greater dimension than the width and provided with a longitudinal slot near one end thereof and with a lug protruding from said sheet metal strip near the other end thereof by punching an approximately U-shaped cut near the other end with the web portion of the U substantially parallel to the longitudinal direction of the strip and subsequently pressing through the thus cut material of the strip whereby an aperture is left in said strip in the former location of the pressed through lug, thereafter forming the strip into the shape of a ring so that the bending edge of said pressed-through material extends in the circumferential direction and inserting said lug into said longitudinal slot, thereupon bending back said lug, and thereafter applying pressure to the bent back lug in such a manner that the material disposed underneath said lug is pressed into the aperture of the U-shaped cut-out.

3. A method for manufacturing closed rings from strips, comprising the steps of:

punching out of the strip having a longitudinal dimension of greater extent than the width at least one longitudinal slot near one end thereof, making at least one approximately U-shaped cut near the other end thereof with the web portion of the U extending substantially parallel to the longitudinal direction and subsequently pressing through the thus cut material to form a tab projecting from the strip whereby an aperture is left in said strip in the prior location of the U-shaped cutout and the bending edge formed between the tab and the strip extends in said longitudinal direction, the web portion of the U-shaped cut being substantially straight and extending in the longitudinal direction of the strip, bending the strip into the shape of a ring and inserting the tab into said longitudinal slot, bending back said tab so as to be approximately parallel to the adjacent surface of the one strip end, and thereafter applying pressure within the area of the interlaced tab to press the material disposed underneath said tab into the aperture of the U-shaped cut-out thereby securely locking the ends of the ring by the thus formed rivet-like joint.

4. A method for manufacturing closed rings from sheet metal strips, especially endless hose clamps which are adapted to be clamped onto a hose or the like by contracting an ear-shaped fold or the like, comprising the steps of:

punching out of the strip having a longitudinal direction with a length much greater than the width thereof at least one longitudinal slot near one end thereof, making at least one approximately U-shaped cut near the other end thereof and subsequently pressing through the thus cut material to form a tab projecting from the strip whereby an aperture is left in said strip in the prior location of the U-shaped cut-out, the web portion of the U-shaped cut being substantially straight and extending in the longitudinal direction so that the bending edge formed between the tab and the strip material extends in said longitudinal direction, and the length of said slot corresponding substantially to the width of the thus formed tab, bending the strip into the shape of a ring and inserting the tab into said longitudinal slot, bending back said tab so as to be approximately parallel to the adjacent surface of the one strip end, and thereafter applying pressure within the area of the interlaced tab in a substantially radial direction to press the material disposed underneath said tab into the aperture of the U-shaped cut-out and thereby securely locking the ends of the ring by the thus formed rivet-like joint.

5. A method for manufacturing closed rings from sheet metal strips, especially endless hose clamps which are adapted to be clamped onto a hose or the like by contracting an ear-shaped fold or the like, comprising the steps of:

punching out of the strip having a longitudinal direction with a length much greater than the width thereof at least one longitudinal slot near one end thereof, making at least one approximately U-shaped cut near the other end thereof at a predetermined distance from said other end and subsequently pressing through the thus cut material to form a tab projecting from the strip whereby an aperture is left in said strip in the prior location of the U-shaped cut-out, the web portion of the U-shaped cut being substantially straight and extending in the longitudinal direction of the strip so that the bending edge formed between the tab and the strip extends in said longitudinal direction, and the length of said slot corresponding substantially to the width of the thus formed tab, bending the strip into the shape of a ring and inserting the tab into said longitudinal slot, bending back said tab so as to be approximately parallel to the adjacent surface of the one strip end, and thereafter applying pressure within the area of the interlaced tab in a substantially radial direction to press the material disposed underneath said tab into the aperture of the U-shaped cut-out and thereby securely locking the ends of the ring by the thus formed rivet-like joint, said predetermined distance being so chosen as to leave sufficient overlap of the ends of the strip to bridge the space left in the circumferential direction by said fold.

6. A method for manufacturing closed rings from strips, comprising the steps of:
producing a first substantially longitudinally extending tab projecting from said strip and bending said first-mentioned tab back upon itself by about 180° whereby a detent is formed by said bent-back tabe while leaving a longitudinal slot withi nthe strip,
producing a second tab projecting from the other end of the strip, while leaving an aperture in the strip,
bending the strip into the form of a ring and inserting said second-mentioned tab into said longitudinal slot,
bending back said second-mentioned tab so as to be approximately parallel to the adjacent surface near the one end of the strip and applying pressure within the area of the thus interlaced second tab in such a manner that the material disposed underneath said second-mentioned tab and including said detent is pressed into said aperture.

7. A method for manufacturing closed rings from sheet metal strips, especially endless hose clamps which are adapted to be clamped onto the hose or the like by contracting an ear-shaped fold or the like, comprising the steps of:
producing a first substantially longitudinally extending tab projecting from said strip and bending said first-mentioned tab back upon itself by about 180° with the bending edge extending substantially in the longitudinal direction whereby a detent is formed by said bent-back tab while leaving a longitudinal slot within the strip at the prior location of the cut-out forming the first tab,
producing a second tab projecting approximately perpendicularly from the other end of the strip, while leaving an aperture in the strip in the prior location of the second-mentioned cut-out forming the second tab,
bending the strip into the form of a ring and inserting said second-mentioned tab into said longitudinal slot,
bending back said second-mentioned tab so as to be approximately parallel to the adjacent surface near the one end of the strip and applying pressure within the area of the thus interlaced second tab in a substantially radial direction in such a manner that the material disposed underneath said second-mentioned tab and including said detent is pressed into said aperture.

8. A method for manufacturing closed rings from strips, comprising the steps of:
making an approximately U-shaped cut near one end of the strip, pressing out the approximately U-shaped cut-out part disposed therebetween as a first tab projecting from said strip and bending said first-mentioned tab back upon itself by about 180° with the bending edge extending substantially in the longitudinal direction whereby a detent is formed by said bent-back tab while leaving a longitudinal slot in the prior location of the cut-out,
making another approximately U-shaped cut near the other end of the strip and pressing out the last-mentioned approximately U-shaped cut-out part of the sheet metal strip to form a second tab projecting from the strip, whereby an aperture is left in the strip in the prior location of the second-mentioned cut-out,
bending the strip into the form of a ring and inserting said second-mentioned tab into said longitudinal slot,
bending back said second-mentioned tab so as to be approximately parallel to the adjacent surface near the one end of the strip and applying pressure within the area of the interlaced second tab in such a manner that the material disposed underneath said second-mentioned tab and including said detent is pressed into the aperture of the U-shaped cut-out.

9. A method for manufacturing closed rings from sheet metal strips, especially endless hose clamps which are adapted to be clamped onto the hose or the like by contracting an ear-shaped fold or the like, comprising the steps of:
making an approximately U-shaped cut near one end of the strip, pressing out the approximately U-shaped cut-out part disposed therebetween as a first tab projecting from said strip and bending said first-mentioned tab back upon itself by about 180° with the bending edge extending substantially in the longitudinal direction whereby a detent is formed by said bent-back tab while leaving a longitudinal slot in the prior location of the cut-out,
making another approximately U-shaped cut near the other end of the strip and pressing out the last-mentioned approximately U-shaped cut-out part of the sheet metal strip to form a second tab projecting approximately perpendicularly from the strip, whereby an aperture is left in the strip in the prior location of the second-mentioned cut-out,
bending the strip into the form of a ring and inserting said second-mentioned tab into said longitudinal slot,
bending back said second-mentioned tab in the original direction so as to be approximately parallel to the adjacent surface near the one end of the strip and applying pressure within the area of the interlaced second tab in a substantially radial direction in such a manner that the material disposed underneath said second-mentioned tab and including said detent is pressed into the aperture of the U-shaped cut-out.

10. A method for manufacturing closed rings from sheet metal strips, especially endless hose clamps which are adapted to be clamped onto the hose or the like by contracting an ear-shaped fold or the like, comprising the steps of:
making an approximately U-shaped cut near one end of the strip, pressing out the approximately U-shaped cut-out part disposed therebetween as a first tab projecting from said strip and bending said first-mentioned tab back upon itself by about 180° with the bending edge extending substantially in the longitudinal direction whereby a detent is formed by said bent-back tab while leaving a longitudinal slot in the prior location of the cut-out,
making another approximately U-shaped cut near the other end of the strip and pressing out the last-mentioned approximately U-shaped cut-out part of the sheet metal strip to form a second tab projecting approximately perpendicularly from the strip, whereby an aperture is left in the strip in the prior location of the second-mentioned cut-out,
bending the strip into the form of a ring and inserting said second-mentioned tab into said longitudinal slot,
bending back said second-mentioned tab in the original direction so as to be approximately parallel to the adjacent surface near the one end of the strip and applying pressure within the area of the interlaced second tab in a substantially radial direction in such a manner that the material disposed underneath said second-mentioned tab and including said detent is pressed into the aperture of the U-shaped cut-out,
said other cut being made at such a distance from the end as to permit a predetermined overlap between the ends of the strip.

11. A riveted joint for a ring-like structure, comprising:
a strip having a longitudinal dimension of greater extent than the width thereof and bent into the shape of a ring-like structure,
and rivet-like joint means for securely and mechanically joining together the two ends of the strip including substantially circumferentially extending slot means near one end of said strip with the greater dimension of the slot extending in the circumferential direction of the ring, tab means near the other end of the strip and integral therewith, and aperture means provided in the other end of the strip adjacent the tab means and corresponding in size substantially to said tab means, said tab means also extending with its greater dimension and with the bending edge formed between the tab means and the strip material substantially in the circumferential direction of the ring-like structure, said tab means having a first portion extending through the slot means and a second portion bent and pressed approximately into the adjacent surface of the one end of the strip in a direction substantially transverse to the longitudinal direction so that said second portion lies substantially in the plane of said one end of said strip and forms a depression therein with said second portion of substantially the same thickness as said first portion while said one end of the strip has a displaced material portion pressed into said aperture means and securely anchored therein in a rivet-like manner.

12. A riveted joint for a ring-like structure and forming for a hose clamp having at least one ear-like fold and made of steel strip material, comprising:

a metallic strip having a longitudinal dimension of greater extent than the width thereof and bent into the shape of a ring-like structure provided with at least one ear-like fold constituted by two approximately radially extending leg portions and a web portion interconnecting the free ends of the leg portions, the other ends of the leg portions being rigid with the ring-like structure, and rivet-like joint means for securely and mechanically joining together the two ends of the strip including substantially circumferentially extending slot means near one end of said strip, tab means near the other end of the strip and integral therewith, the greater dimension of said slot means and of said tab means extending in said circumferential direction, and aperture means provided in the other end of the strip adjacent the tab means and corresponding in size substantially to said tab means, said tab means also extending with the bending edge formed between said tab means and the strip material substantially in the circumferential direction of the ring-like structure, said tab means having a first portion extending through the slot means and a second portion bent and pressed back approximately into the adjacent surface of the one end of the strip in a direction substantially transverse to the longitudinal direction so that said second portion lies in the plane of said one end of said strip and forms a depression therein with said second portion of substantially the same thickness as said first portion, while said one end of the strip has a displaced material portion pressed into said aperture means and securely anchored therein in a rivet-like manner.

13. A riveted joint for a ring-like clamp structure, comprising:

a strip having a longitudinal dimension of greater extent than the width thereof and bent into the shape of a ring-like structure, and a plurality of rivet-like joint means distributed over the width of the strip for securely and mechanically joining together the two ends of the strip including substantially circumferentially extending slot means near one end of said strip with the greater dimension of the slot means extending in the circumferential direction of the ring, tab means near the other end of the strip, and aperture means provided in the other end of the strip adjacent the tab means and corresponding in size substantially to said tab means, said tab means also extending with its greater dimension and with the bending edge formed between the tab means and the strip material substantially in the circumferential direction of the ring-like structure, said tab means having a first portion extending through the slot means and a second portion bent and pressed approximately into the adjacent surface of the one end of the strip in a direction substantially transverse to the longitudinal direction so that said second portion lies in the plane of said one end of said strip and forms a depression therein with said second portion of substantially the same thickness as said first portion, while said one end of the strip has a displaced material portion pressed into said aperture means and securely anchored therein in a rivet-like manner.

14. A riveted joint for a ring-like structure constituting a hose clamp having a least one ear-like fold and made of steel strip material, comprising:

a metallic strip having a longitudinal dimension of greater extent than the width thereof and bent into the shape of a ring-like structure provided with at least one ear-like fold constituted by two approximately radially extending leg portions and a web portion interconnecting the free ends of the leg portions, the other ends of the leg portions being rigid with the ring-like structure, and rivet-like joint means for securely and mechanically joining together the two ends of the strip including substantially circumferentially extending slot means near one end of said strip, tab means near the other end of the strip at a predetermined distance from said other end and integral with said strip, and aperture means provided in the other end of the strip adjacent the tab means and corresponding in size substantially to said tab means, said tab means also extending with the bending edge formed between said tab means and the strip material substantially in the circumferential direction of the ring-like structure, said tab means having a first portion extending through the slot means and a second portion bent and pressed back approximately into the adjacent surface of the one end of the strip in a direction substantially transverse to the longitudinal direction so that said second portion lies in the plane of said one end of said strip and forms a depression therein with said second portion of substantially the same thickness as said first portion, while said one end of the strip has a displaced material portion pressed into said aperture means and securely anchored therein in a rivet-like manner, and said predetermined distance being of such length that said other end overlaps with said one end a sufficient distance to bridge the other ends of the fold leg portions.

15. A riveted joint for a ring-like structure, comprising:

a strip bent into the shape of a ring-like structure, and rivet-like joint means for securely and mechanically joining together the two ends of the strip including substantially circumferentially extending tab means near one end of said strip, circumferentially extending slot means provided near said one end adjacent to the respective tab means, tab means near the other end of the strip, and aperture means provided in the other end of the strip adjacent the respective tab means, said second-mentioned tab means also extending substantially in the circumferential direction of the ring-like structure, said two tab means extending in substantially radially opposite directions, said second-mentioned tab means having a first portion extending through the slot means and a second portion bent back upon itself and pressed back approximately into the plane of the adjacent surface of the one end of the strip while the first-mentioned tab means of said one end of the strip is pressed into said aperture means and securely anchored therein in a rivet-like manner.

16. A riveted joint for a ring-like structure, especially for a hose clamp having at least one ear-like fold and made of steel strip material, comprising:

a metallic strip bent into the shape of a ring-like structure provided with at least one ear-like fold constituted by two approximately radially extending leg portions and a web portion interconnecting the free ends of the leg portions, the other ends of the leg portions being rigid with the ring-like structure, and rivet-like joint means for securely and mechanically joining together the two ends of the strip including substantially circumferentially extending tab means near one end of said strip, circumferentially extending slot means provided near said one end adjacent to the respective tab means, tab means near the other end of the strip, and aperture means provided in the other end of the strip adjacent the respective tab means, said second-mentioned tab means also extending substantially in the circumferential direction of the ring-like structure, said two tab means being directed in radially opposite directions, said second-mentioned tab means having a first portion extending through the slot means and a second portion bent back upon itself and pressed back approximately into the plane of the adjacent surface of the one end of the strip while the first-mentioned tab means of said one end of the strip is pressed into said aperture means and securely anchored therein in a rivet-like manner.

17. A riveted joint for a ring-like structure, comprising:

a strip bent into the shape of a ring-like structure, and a plurality of rivet-like joint means distributed over the width of the strip for securely and mechanically joining together the two ends of the strip including substantially circumferentially extending tab means near one end of said strip, circumferentially extending slot means provided near said one end adjacent to the respective tab means, tab means near the other end of the strip, and aperture means provided in the other end of the strip adjacent the respective tab means, said second-mentioned tab means also extending substantially in the circumferential direction of the ring-like structure, said two tab means extending in substantially radially opposite directions, said second-mentioned tab means having a first portion extending through the slot means and a second portion bent back upon itself and pressed back approximately into the plane of the adjacent surface of the one end of the strip while the first-mentioned tab means of said one end of the strip is pressed into said aperture means and securely anchored therein in a rivet-like manner.

18. A riveted joint for a ring-like structure, especially for a hose clamp having at least one ear-like fold and made of steel strip material, comprising:

a metallic strip bent into the shape of a ring-like structure provided with at least one ear-like fold constituted by two approximately radially extending leg portions and a web portion interconnecting the free ends of the leg portions, the other ends of the leg portions being rigid with the ring-like structure, and rivet-like joint means for securely and mechanically joining together the two ends of the strip including substantially circumferentially extending tab means near one end of said strip, circumferentially extending slot means provided near said one end adjacent to the respective tab means, tab means near the other end of the strip at a predetermined distance from said other end, and aperture means provided in the other end of the strip adjacent the respective tab means, said second-mentioned tab means also extending substantially in the circumferential direction of the ring-like structure, said two tab means being directed in approximately radially opposite directions, said second-mentioned tab means having a first portion extending through the slot means and a second portion bent back upon itself and pressed back approximately into the plane of the adjacent surface of the one end of the strip while the first-mentioned tab means of said one end of the strip is pressed into said aperture means and securely anchored therein in a rivet-like manner, and said predetermined distance being of such length that said other end overlaps with said one end a sufficient distance to bridge the other ends of leg portions of the fold.

References Cited by the Examiner

UNITED STATES PATENTS

| | | | |
|---|---|---|---|
| 338,877 | 3/1886 | Ritchie. | |
| 384,118 | 6/1888 | Bellinger | 138—166 X |
| 518,767 | 4/1894 | Plecker | 138—166 X |
| 548,483 | 10/1895 | Vogel | 24—20 |
| 1,677,828 | 7/1928 | Howlett | 24—20 |
| 3,020,631 | 2/1962 | Kennedy | 29—150 X |
| 3,034,209 | 5/1962 | Bianca et al. | 29—521 X |

FOREIGN PATENTS

| | | |
|---|---|---|
| 24,929 | 11/1907 | Great Britain. |
| 144,877 | 6/1920 | Great Britain. |

WILLIAM FELDMAN, *Primary Examiner.*

DONLEY J. STOCKING, *Examiner.*

D. L. TROUTMAN, *Assistant Examiner.*